US006454424B1

(12) United States Patent
Tobin et al.

(10) Patent No.: US 6,454,424 B1
(45) Date of Patent: Sep. 24, 2002

(54) RV LIGHT LENS

(75) Inventors: Michael Tobin, Burlington, CT (US); Darrel A. Holtz, Mankato, MN (US); Samir R. Gami, Bloomington, MN (US); Marvin Menk, Mankato, MN (US); Adam Mongeau, North Mankato, MN (US); David Bellig, Mankato, MN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/686,636

(22) Filed: Oct. 11, 2000

(51) Int. Cl.[7] ............................................. F21V 33/00
(52) U.S. Cl. ........................ 362/95; 362/154; 362/564; 362/375
(58) Field of Search ........................... 362/95, 154, 364, 362/365, 374, 375

(56) References Cited

U.S. PATENT DOCUMENTS

| | | | | |
|---|---|---|---|---|
| 1,349,651 A | * | 8/1920 | Bartlett | |
| 4,546,418 A | * | 10/1985 | Baggio et al. | 362/85 |
| 4,951,182 A | * | 8/1990 | Simonson et al. | 362/145 |
| 4,953,067 A | * | 8/1990 | Moore | 362/431 |
| 5,039,832 A | * | 8/1991 | Polacek et al. | 200/317 |
| 5,184,279 A | * | 2/1993 | Horn | 361/356 |
| 5,925,848 A | * | 7/1999 | Elliott, Jr. | 174/38 |

* cited by examiner

*Primary Examiner*—Thomas M. Sember
*Assistant Examiner*—Jacob Y. Choi
(74) *Attorney, Agent, or Firm*—Cantor Colburn LLP

(57) ABSTRACT

A service unit provided with a door having an evenly illuminated lens is disclosed. The service panel, typically containing at least one outlet, provided behind the door further preferably includes a socket for receiving a lamp. The lamp used in the present invention preferably directs light towards a bottom side of the unit, in a direction across the lens when the door is in a closed position, such that the light is evenly distributed across the lens. The door includes an opening for receiving the lens that is further preferably provided with an indented lip recessed from the front surface of the door such that the lens lies substantially flush with the front surface of the door. A plastic rivet may secure the lens to the lip, as may a bead of adhesive along the lip. The lip is preferably not present along the top side of the opening for allowing the top side of the opening to serve as a rain shed for the lens. The lens may include an alphanumeric symbol for identifying a particular camp site.

21 Claims, 7 Drawing Sheets

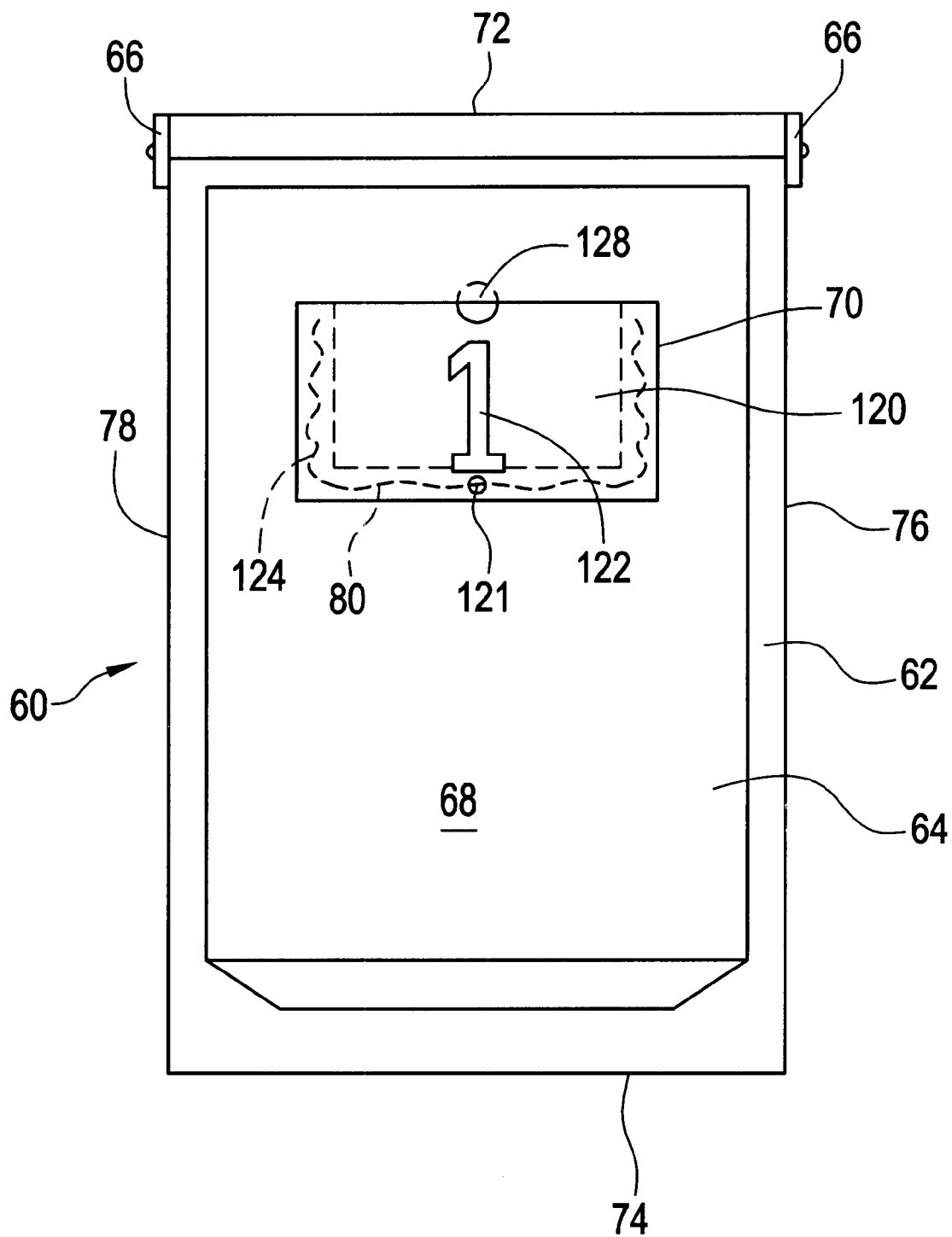

RV LIGHT LENS

BACKGROUND OF THE INVENTION

This invention relates generally to electrical service panels, and more particularly, this invention relates to the even distribution of light across a lens in a door of an electrical service panel.

Recreational vehicle ("RV") parks use electrical service panels to provide electricity to its customers. The park owners desire lighting on these units to show the number of the campsite and also to provide lighting when the customer is plugging into the service panel. The customer desires equipment that looks nice as the equipment is obvious in every camp site. A water tight seal is needed to prevent water from getting into the panel.

One prior art unit, shown in FIG. 1, supplies a standard electrical hub connection 14 on top of the unit 12 where a Pagoda light 16 can be installed. A pagoda light, such as pagoda light 16, illuminates an area on the ground, and light emitted is spread radially. The Pagoda light 16 does not provide light inside the unit 12 when the customer is plugging into the service equipment. In fact, when the door 18 is opened as shown, the outlets 20 and 22 are shadowed by the door 18 and adequate light is not provided to the customer during plugging in. The Pagoda light 16 also does not provide a location for installing the number of the campsite.

Another prior art configuration, shown in FIGS. 2 and 3, shows a unit 30 with an optional meter opening 32 and a location 34 where a door (not shown) may be hinged to hinges 36. A lens 38 carrying an alphanumeric symbol 40 is positioned above an opening 42 in the unit and riveted with a plurality of rivets 44. The riveted lens 38 provides a water tight seal although it cosmetically looks very unprofessional. Turning to FIG. 3, a separator wall 48 is shown dividing the space occupied by the meter opening 32 and the space provided below the lens 38. A wire clip 46 is used to align the separator wall 48 within the front panel 31. Attached to the separator wall 48 is a lamp 50 to which is secured a plurality of LED's 52 directed towards the base of the unit 30. A white background 54 is used to reflect the light from the LED's 52. Unfortunately, this does not provide an even pattern of light across the lens 38. Additionally, when the door (not shown) is opened for accessing the outlets (not shown), the LED's 52 are directing light towards the base of the unit 30 rather than towards the outlets, and thus optimum lighting for the customer is not provided.

BRIEF SUMMARY OF THE INVENTION

The above discussed and other drawbacks and deficiencies are overcome or alleviated by a service unit having a top side and a bottom side, a front surface and a rear surface, the unit further comprising a service panel having a dead front and a rear defining the rear surface of the unit, a door covering the dead front of the service panel in a closed position of the door, a front surface of the door defining the front surface of the unit, the door movable between the closed position and an open position, the door having a window, and, a lamp, wherein, when the door is in the closed position, light is directed from the lamp across the window in a direction away from the top side of the unit and towards the bottom side of the unit.

The above-discussed and other features and advantages of the present invention will be appreciated and understood by those skilled in the art from the following detailed description and drawings.

BRIEF DESCRIPTION OF THE DRAWINGS

Referring to the FIGURES wherein like elements are numbered alike in the several FIGURES.

DETAILED DESCRIPTION OF THE PREFERRED EMBODIMENTS

Figure 1:
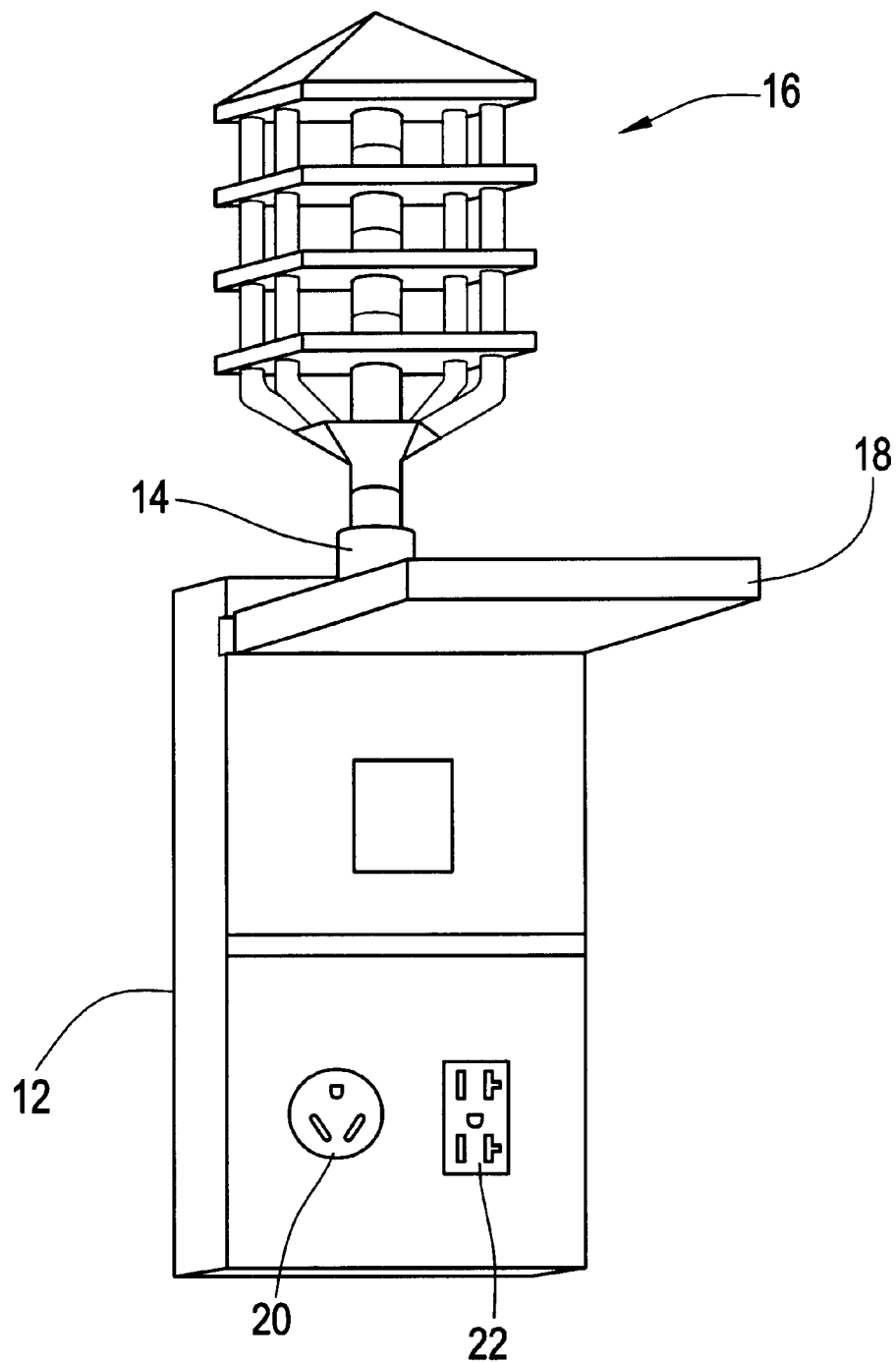
FIG. 1 shows a perspective view of one prior art configuration.
Figure 2:
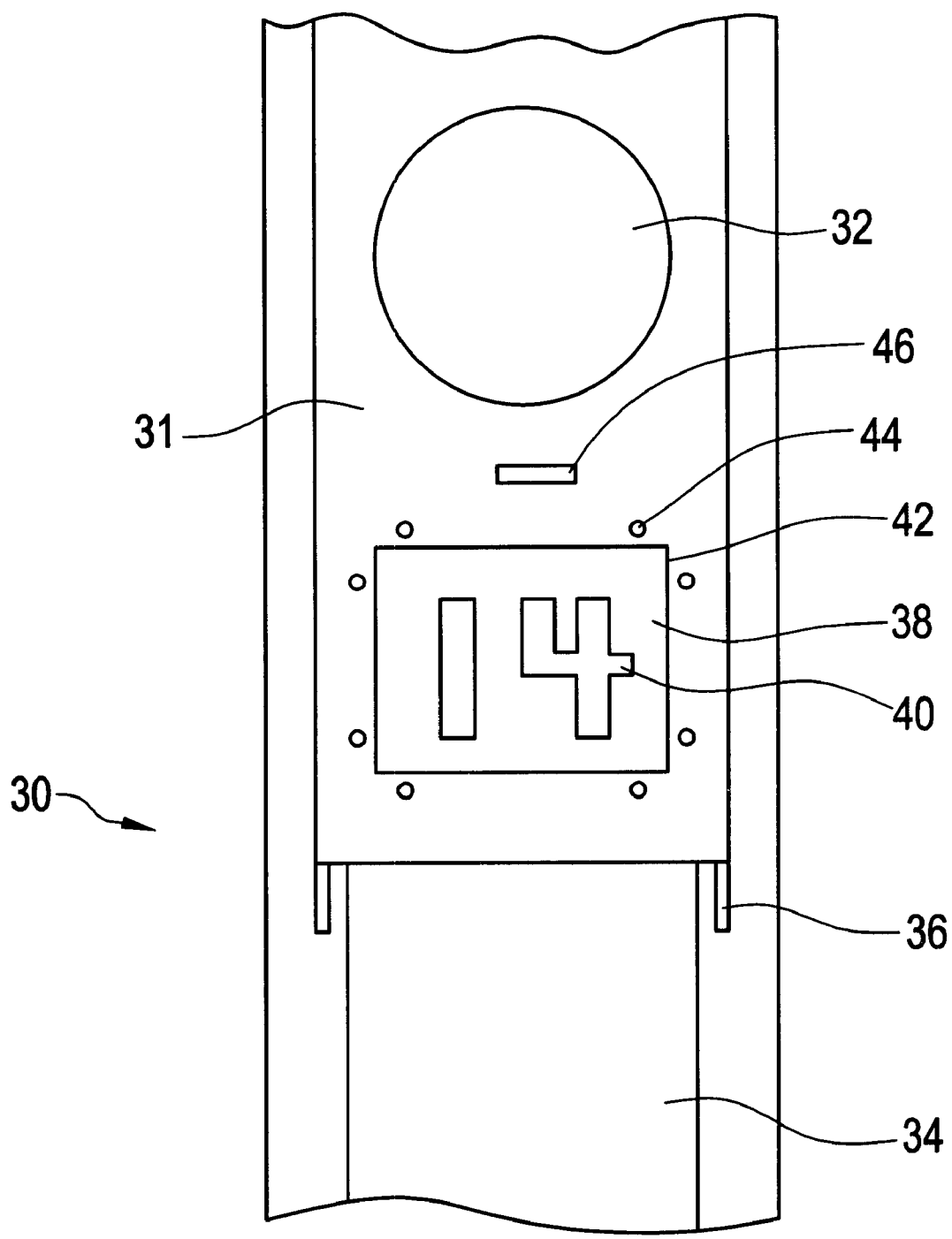
FIG. 2 shows a front plan view of another prior art configuration.
Figure 3:
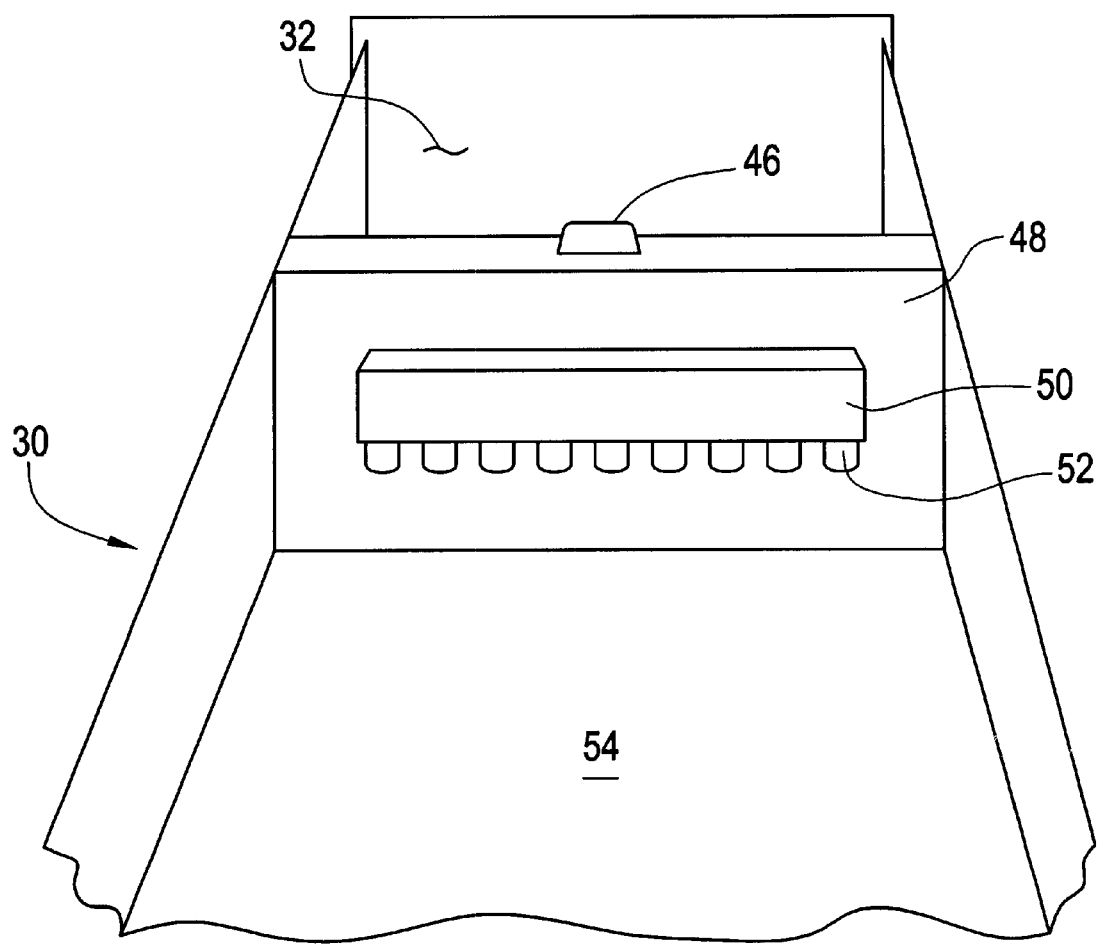
FIG. 3 shows a front perspective interior view of the prior art configuration of FIG. 2.
Figure 4:
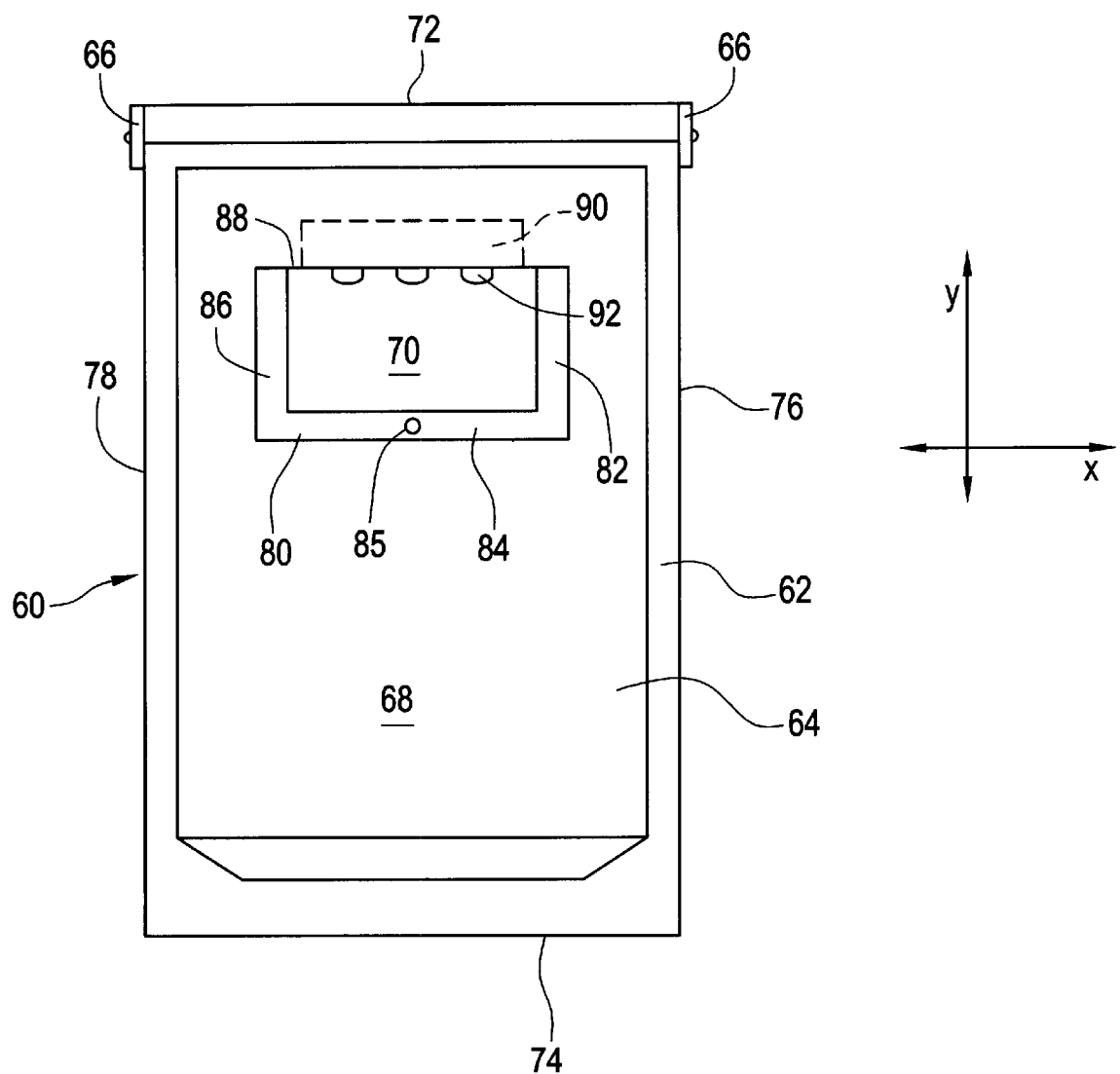
FIG. 4 shows a front plan view of the present invention with lens removed.

An exemplary embodiment of the present invention is shown in FIG. 4. to The unit 60 as shown could take advantage of either a surface mount or a pedestal mount that uses a post to support the unit 60. Although not shown, the unit 60 could also include a built in meter socket as shown in FIG. 2. The unit 60 includes a front panel 62 supporting a hinged door 64 supported by hinges 66. The front surface 68 of the hinged door 64 includes a window or opening 70 for receiving a lens (not shown). The unit 60 includes a top side 72, bottom side 74, a right side 76, and a left side 78. The opening 70 is preferably positioned closer to the top side 72 than the bottom side 74 for reasons that will be further discussed below. Preferably, the opening 70 is also positioned symmetrically between the right and left sides 76, 78.

As further shown in FIG. 4, the opening 70 includes an indented supporting lip 80 which is recessed from, and preferably lying in a substantially parallel plane as, the front surface 68. The lip 80 may include a first strip-like portion 82 lying substantially parallel to the right and left sides 76, 78 but closer to the right side 76. The lip 80 may further include a second strip-like portion 86 lying substantially parallel to the right and left sides 76, 78 but closer to the left side 78. The lip 80 may further include a third strip-like portion 84 lying substantially parallel to the top and bottom sides 72, 74. The first strip-like portion 82 substantially defines the right side of the opening 70, the second strip-like portion 86 substantially defines the left side of the opening 70, and the third strip-like portion 84 substantially defines the bottom side of the opening 70. The top side 88 of the opening 70 preferably does not include a strip-like portion that is parallel to the top and bottom sides 72, 74 of the unit 60. The lack of an indented lip along the top side 88 of the opening 70 provides a rain shed for the unit 60.

Although a substantially rectangularly-shaped opening 70 with a correspondingly designed lip 80 has been described, it should be understood that other shaped openings with correspondingly designed lips are also within the scope of this invention.

Shown in phantom in FIG. 4 is a lamp 90 positioned beneath the door 64 and above the opening 70. That is, the lamp 90 is positioned closer to the top side 72 of the unit 60 than the opening 70 is. With the lamp 90 positioned adjacent the top side 88 of the opening 70, bulbs 92 are shown directing light towards the bottom side 74 of the unit 60 and in the direction of the negative y axis. The bulbs 92 may be slightly visible from the opening 70, or, alternatively, they may be hidden from view by the door 64 as is the lamp 90. Although three bulbs 92 are shown, it should be understood that any number of bulbs could be used, including just one, depending on the wattage of the lamp and the desired illumination across the opening 70. The bulbs 92 are preferably light emitting diode ("LED") bulbs, although other types of bulbs are usable within the present invention. LED's are preferred because of their long-life. Some LED's can last as much as 11 years or more with non-stop use. While initially more costly than incandescent bulbs, LED's quickly pay for themselves through lower maintenance costs and lower power use. Also, LED's are better able to withstand physical shocks, vibration, and temperature extremes than incandescent bulbs.

Figure 5:
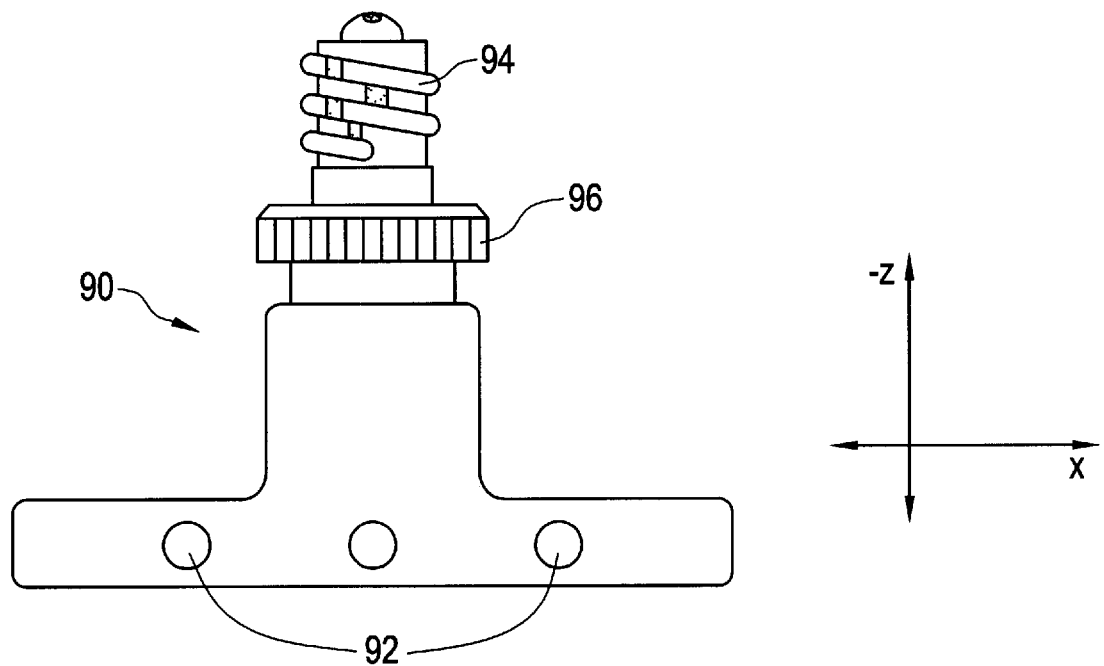
FIG. 5 shows an exemplary lamp for use with the present invention shown in FIG. 4.

Lamp 90 is further shown in FIG. 5 with bulbs 92 pointing in a direction extending perpendicularly outward from the page (the −y direction). The lamp 90 preferably includes a candelabra type base 94 that is used to install the lamp 90 into a socket 98 (FIG. 6) in the dead front 102 of the service panel 100 of the unit 60. A pivot 96 in the lamp 90 may be used to position the bulbs 92 to point in the desired direction. Although a candelabra base 94 is described in connection with the lamp 90, alternate types of lamp bases such as bayonet or intermediate may be usable with the present invention. Likewise, the socket 98 may be designed to accept alternate types of lamp bases.

Figure 6:
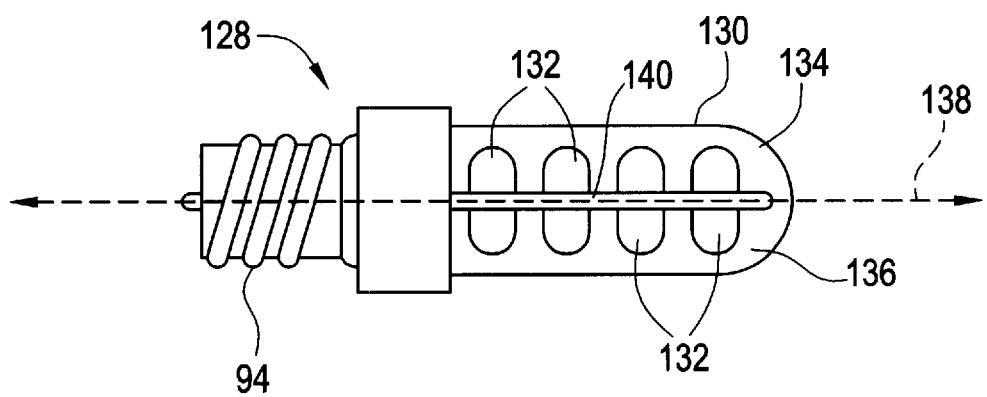
FIG. 6 shows a side plan view of an exemplary bulb configuration for use with the present invention shown in FIG. 4.

An alternate, and simpler, bulb configuration 128 is shown in FIG. 6. The candelabra type bulb, such as that supplied by Astra Lite, includes a candelabra type base 94 and a bulb portion 130. The bulb portion 130 includes LED's 132 on both sides 134, 136 of the bulb portion 130. An electronic board 140 inside the bulb configuration 128 enables additional travel of the bulb portion 130 about its longitudinal axis 138 relative to the threads of the candelabra base 94. With the bulb configuration 128 secured within the socket 98 (as will be shown in FIG. 7), the bulb portion 130 may rotate an additional 180 degrees about its longitudinal axis 138. Because there are LED's 132 positioned on both sides 134 and 136 of the bulb portion 130, the bulb portion 130 can be easily rotated to a direction in which LED's are directing illumination towards the bottom side 74 of the unit 60. Note that the direction of illumination of the LED's is substantially perpendicular to the longitudinal axis 138 of the bulb configuration 128.

Figure 7:
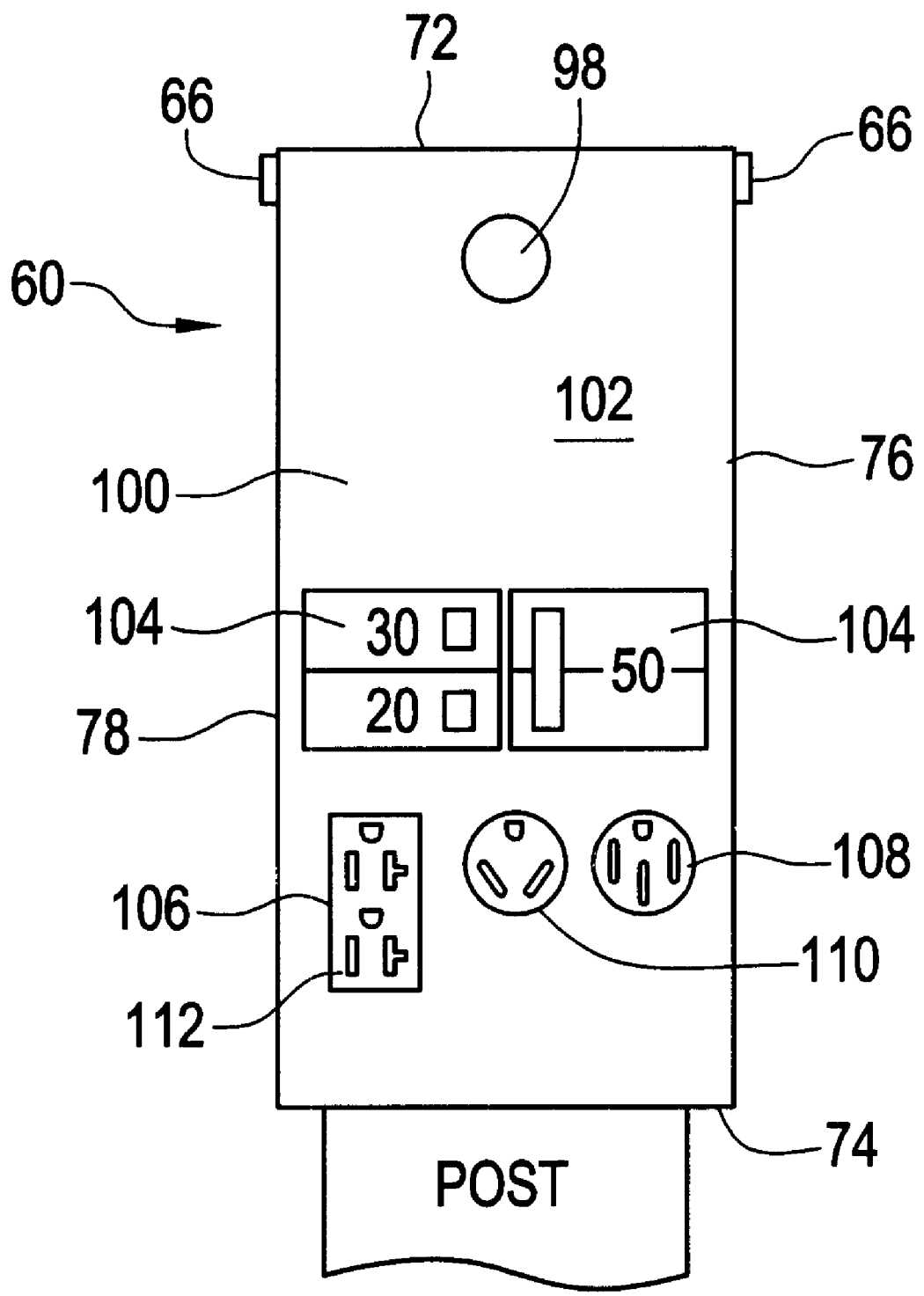
FIG. 7 shows a front plan view of an exemplary interior of the present invention; and, FIG. 8 shows a front plan view of the present invention with lens installed.

Turning now to FIG. 7, the unit 60 is shown with the door 64 removed. A service panel 100, which is hidden from view in FIG. 4 by the door 64, is shown with the socket 98 installed in the dead front 102. By "dead front" it is meant that all of the live terminations for the panel 100 are made on the rear side (not shown) of the panel 100. The front 100 may include access to circuit breakers 104 and various receptacles 106 including, but not limited to 50 Amp outlet 108, 30 Amp outlet 110, and 20 Amp outlet 112. Of course, a variety of outlets and breakers may be provided as warranted by the park for meeting the needs of its customers.

As previously described, when the lamp 90 is installed in the socket 98, the bulbs 92 direct light towards the bottom side 74 of the unit 60. Similarly, when the bulb configuration 128 is installed in the socket 98, the LED's 132 direct light towards the bottom side 74 of the unit 60. In addition to providing an even stream of light across the opening 70, the light is also directed over the breakers 104 and outlets 106 such that when the door 64 is opened and the customer is ready to begin plugging-in whatever plugs are needed for running their RV or other camp gear, the customer has adequate illumination available. Providing adequate illumination eliminates the dangers of a customer "feeling" for the right outlet or inadvertently attempting to insert a plug into the wrong outlet. Although unconventional, it would also be within the scope of this invention to provide the opening 70 closer to the bottom side 74 of the unit 60, with the socket 98 positioned between the opening 70 and the bottom 74 such that the light from the lamp 90 or bulb configuration 128 is directed across the opening 70 and towards the top side 72. With breakers 104 and outlets 106 positioned between the opening 70 and the top side 72, light will still be directed over these elements in such a reversed design.

Alternatively, the lamp 90 or bulb configuration 128 could be mounted to the rear surface (not shown) of the door 64 such that the bulbs 92 and LED's 132 still direct light across the opening 70 from a top side 88 to a bottom side of the opening 70. This design, however, does not provide direct illumination towards the outlets 106 when the door 64 is opened. A pivot in the lamp 90 could be used to direct the light as needed once the door 64 is opened, but then the lamp 90 would have to be readjusted prior to closing the door 64. Thus, while this embodiment would satisfactorily illuminate across the opening 70, the previous embodiment is preferred.

Turning now to FIG. 8, and with reference to FIG. 4, a lens 120, including an alphanumeric symbol 122 identifying a particular campsite, is inserted into the opening 70. To secure the lens 120 to the door 64, a bead of adhesive 124, shown in phantom, may be placed along the indented lip 80, also shown in phantom, prior to inserting the lens 120 into the opening 70. The adhesive 124 is preferably a room temperature vulcanizing ("RTV") silicone adhesive sealant, which is a silicone caulk that will solidify and set at room temperature. RTV is very dielectric so it can also advantageously be used as an insulator. RTV is suitable for bonding glass with other substrates such as metal. The door 64 of the unit 60 likely made of steel or other like metal for durability, and therefore RTV is a suitable choice for sealant. While the rain-shed designed opening 70, as described above, should be suitable for maintaining the rain-proof integrity of the unit 60, the adhesive 124 provides the customer with an added degree of confidence in the water integrity of the unit 60.

To further secure the lens 120 within the opening 70, a single plastic rivet 121 may be used to prevent the lens 120 from falling out the front. The rivet 121 preferably includes a head and a post having an adequate length to pass through both the rivet hole 85 and a rivet hole (hidden from view) provided in the lens 120 at a location where the rivet hole in the lens 120 is aligned with the rivet hole 85 in the third strip like portion 84 in the lip 80 on the door 64. The design of the opening 70, in particular the lip 80, prevents the lens 120 from being pushed in, and the use of the rivet 121 and/or the adhesive 124 prevents the lens 120 from falling out. Thus, the lens 120 is securely seated within opening 70. Aesthetically, the lens 120 is preferably as thick as the indented lip 80 is recessed from the front surface 68. Thus, when the lens 120 is placed onto the lip 80, it lies substantially flush with the front surface 68 for providing a substantially uninterrupted smooth surface.

Both the lamp 90 and the bulb configuration 132 direct light from the top side 88 of the opening 70 towards the bottom side of the opening 70. Thus, light is directed evenly across the lens 120, rather than directly towards it or reflected towards it. Even lighting is thus achieved on the lens eliminating regions of higher intensity (bright spots), which detract from the attractiveness of the lighting. Although this design has been described in conjunction with RV camp sites, it should be appreciated that other uses and locations for the present invention are within the scope of this invention.

Thus, a light lens has been described which allows a rain proof and secure design without the need of a gasket and without unsightly rivet or screws on the outside of the unit. By positioning the LED light above the lens and directing the LED's downward across the lens, an even lighting can be achieved on the lens. Advantageously, the light is also directed towards the outlets of the service panel further assisting the customer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A service unit having a top side, a bottom side, and a front surface, the unit further comprising:
    a service panel having a dead front;
    a door covering the dead front of the service panel in a closed position of the door, a front surface of the door defining the front surface of the unit, the door movable between the closed position and an open position, the door having a window, the window having an indented lip recessed from the front surface of the door, the lip extending around a periphery of the window except for a top side of the window; and,
    a lamp, wherein, when the door is in the closed position, light is directed from the lamp across the window in a direction parallel with the front surface of the door.

2. The service unit of claim 1 wherein, when the door is in the closed position, the lamp is positioned between the top side of the unit and a top side of the window.

3. The service unit of claim 1 further comprising a bulb connected to the lamp and pointing towards a bottom side of the unit.

4. The service unit of claim 3 wherein the bulb comprises a light emitting diode.

5. The service unit of claim 3 further comprising a plurality of bulbs.

6. The service unit of claim 1 further comprising a lens placed on top of the lip.

7. The service unit of claim 6 wherein a thickness of the lens is substantially equal to a depth measured from the front surface of the door to the indented lip.

8. The service unit of claim 6 wherein the lens lies flush with the front surface of the door.

9. The service unit of claim 6 further comprising a bead of adhesive placed along the lip to adhere the lens to the lip.

10. The service unit of claim 6 further comprising a rivet attaching the lens to the lip.

11. The service unit of claim 6 further comprising an alphanumeric symbol on the lens.

12. The service unit of claim 1 wherein the lamp includes a base adapted for securing to a lamp socket provided in the dead front of the service panel.

13. The service unit of claim 12 wherein the base is a candelabra base.

14. The service unit of claim 12 wherein the lamp includes at least one LED and wherein a longitudinal axis of the base is substantially perpendicular to a longitudinal axis of the at least one LED.

15. The service unit of claim 14 wherein the bulb directs illumination in a direction parallel with the dead front of the service panel.

16. The service unit of claim 1 wherein the service panel includes a circuit breaker.

17. The service unit of claim 1 further comprising a post for mounting the unit in a pedestal manner.

18. The service unit of claim 1 wherein the door is hinged at the top side of the unit.

19. The service unit of claim 1 wherein the service panel includes an outlet for receiving a plug.

20. The service unit of claim 19 wherein the window is closer to the top side of the unit than the outlet.

21. A service unit having a top side and a bottom side, the unit further comprising:
    a service panel having a dead front with a lamp socket;
    a door movable between a closed position and an open position, the door covering the dead front of the service panel in the closed position;
    a window in the door, wherein, when the door is in the closed position, the lamp socket is positioned between the top side of the unit and a top side of the window; and,
    a lamp secured to the lamp socket, wherein the lamp has a longitudinal axis perpendicular to the dead front of the service panel and wherein the lamp includes a light emitting diode which directs light in a direction perpendicular to the longitudinal axis of the lamp, wherein, when the door is in the closed position, light is directed from the lamp across the window, in a direction starting from the top side of the window and pointing to the bottom side of the unit and parallel with the dead front.

* * * * *